June 26, 1962 J. W. OXBERRY 3,040,619
OPTICAL PRINTER HAVING A PLURALITY OF PROJECTOR HEADS
Filed Jan. 4, 1960 4 Sheets-Sheet 2
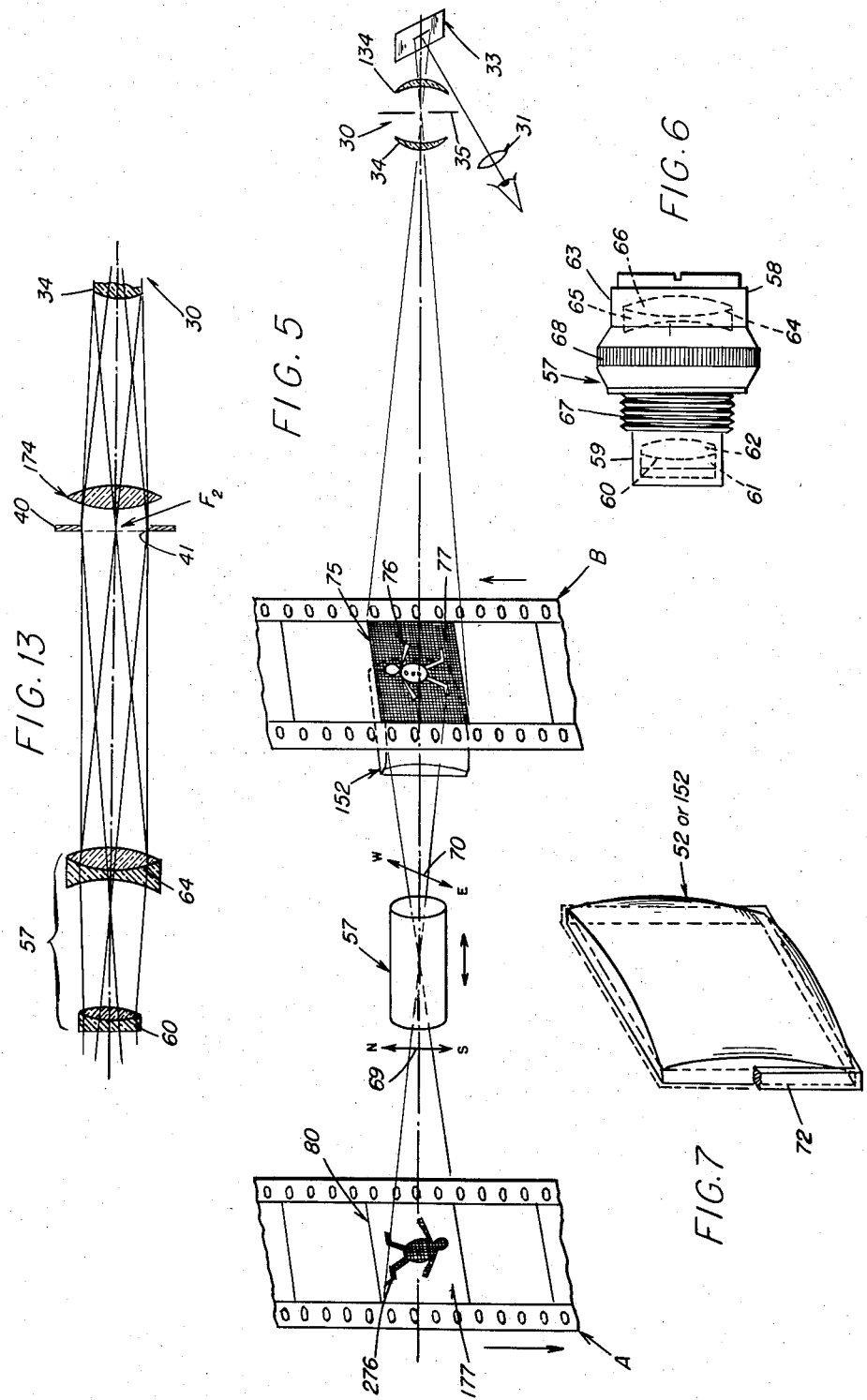

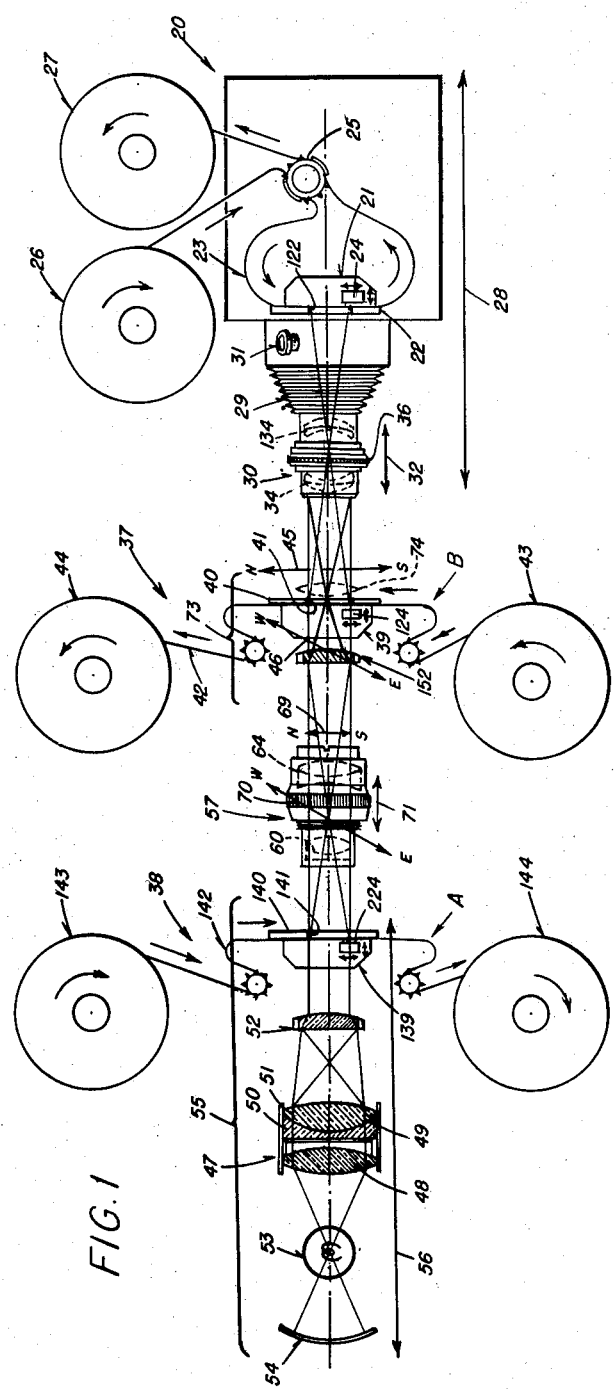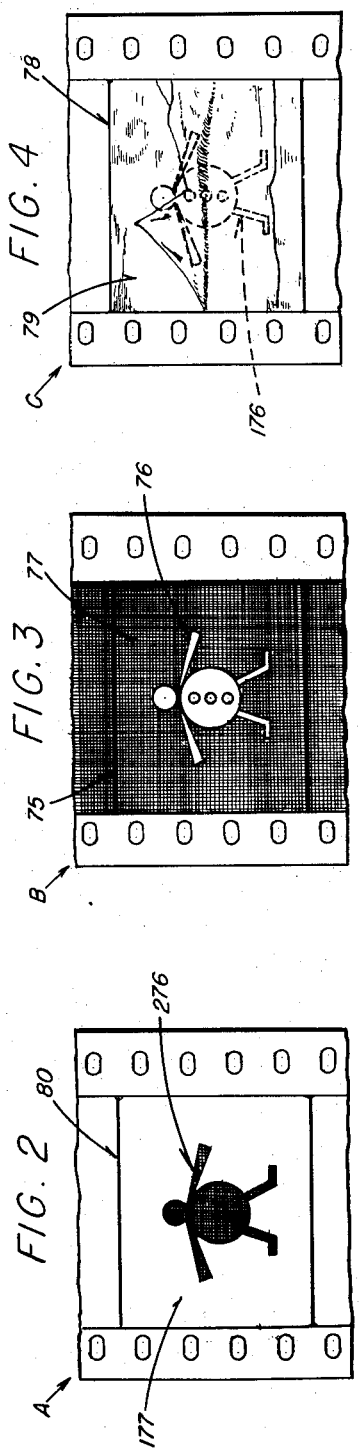

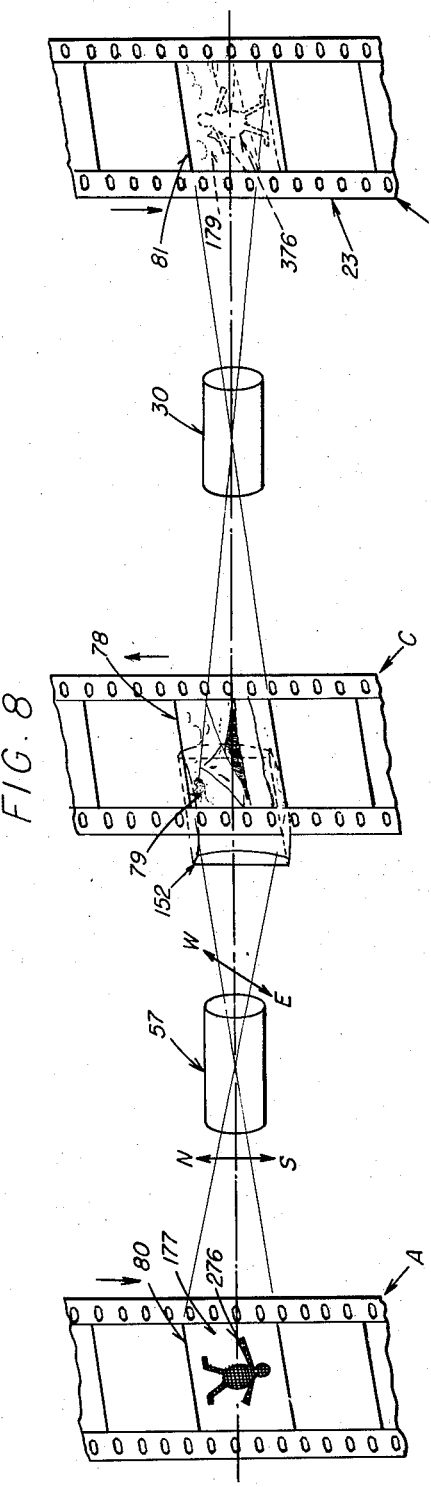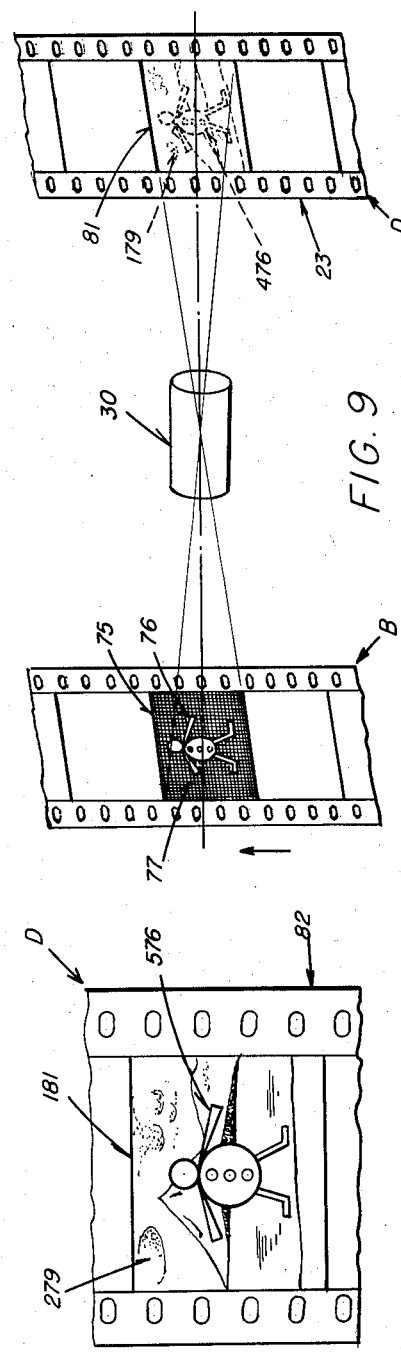

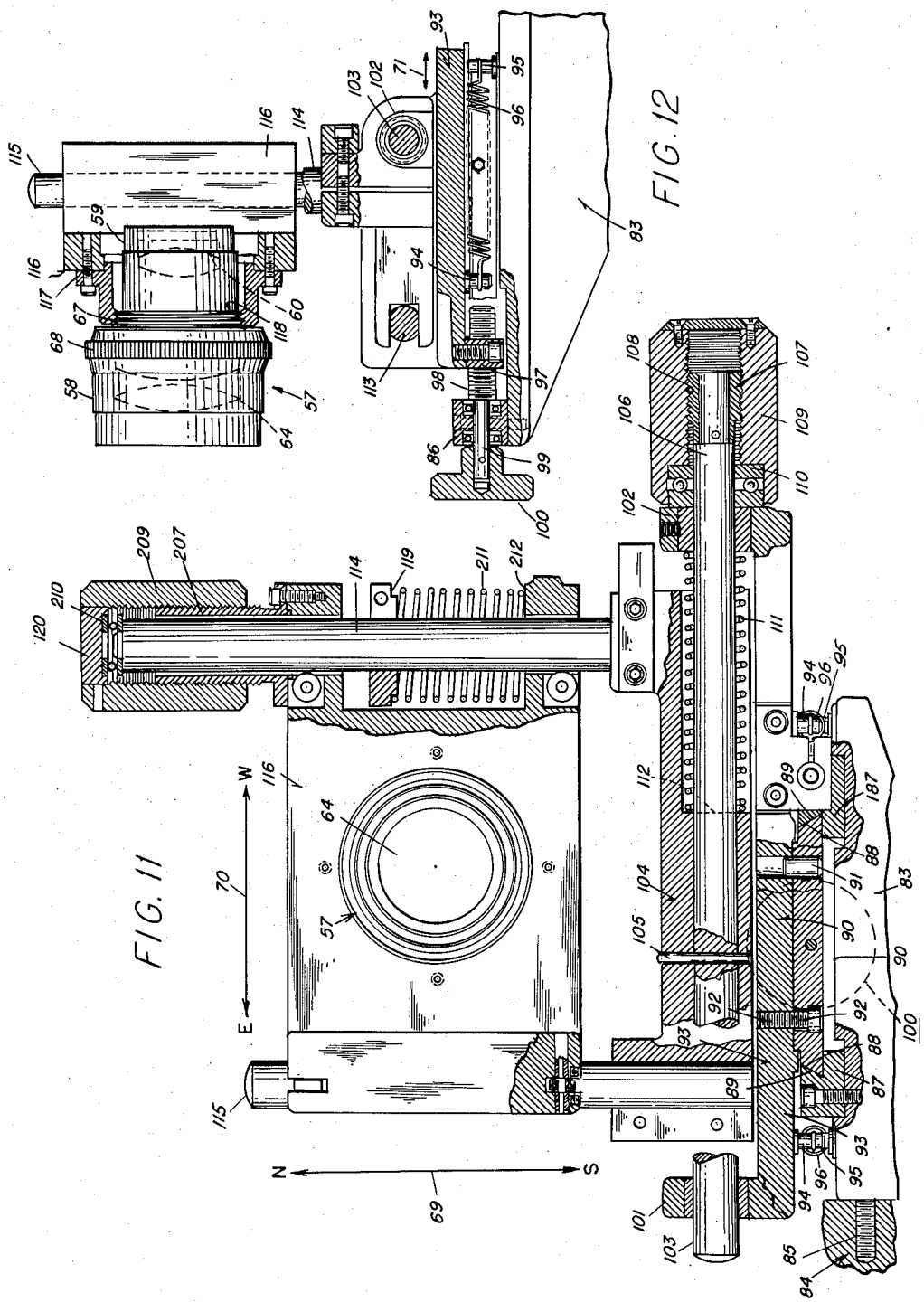

United States Patent Office
3,040,619
Patented June 26, 1962

3,040,619
OPTICAL PRINTER HAVING A PLURALITY OF PROJECTOR HEADS
John W. Oxberry, New Rochelle, N.Y., assignor to The Animation Equipment Corporation, New Rochelle, N.Y., a corporation of New York
Filed Jan. 4, 1960, Ser. No. 139
4 Claims. (Cl. 88—24)

The present invention relates to optical printers of the type employed to produce motion picture films carrying composite images either in the form of montage plural-split composite images or in the form of background or scenic images and images of foreground action, titles, etc. superposed on the former, and in which may be incorporated various special effects, such as "zoom" in and out effects, dissolves, wipe-offs, vignetting and other special effects incorporated in parts or all of the split or superposed image portions. It is particularly adapted to the production of standard 35 mm. size of strips of plural-frame motion picture film employed professionally in theaters for exhibiting motion pictures but is not limited to use in the production of such size film.

Conventionally, in the preparation of motion picture films with special effects, composite images have been prepared by contact printing and optical printing procedures involving bi-pack operations in which specially prepared mattes have been transported or translated with fine-grain positive prints and/or camera raw stock film in face-to-face contact through gates. Such practices are quite involved, time consuming and hazardous to the conditions of fine-grains and raw stock when translated through the gates with mattes, scratching thereof frequently resulting. These and other problems have been efficiently minimized or eliminated by procedures made possible and practical by the optical printer of the present invention while permitting practice therewith of conventional printing procedures where considered advantageous.

A general object of the present invention is to provide an optical printer having an plurality of projector heads so associated together that one may project an aerial image to the gate aperture of another for assembly at the latter of the portions of the composite images to permit effective photographing of the composite images on camera raw stock film while permitting exact alignments or registrations to avoid halo effects and dark line margins at the meeting edges of different portions of the composite images and with avoidance of marginal vignetting of the total image area so as to assure substantial even distribution of light throughout the image field.

A more specific object of the present invention is to provide such an optical printer in which a pair of projector heads are optically aligned with a camera and in spaced relation along the optical axis of the camera lens assembly with a common projecting light source being employed beyond the projector head farthest from the camera, unique optical means being inserted between the projector heads effectively to transfer an in-focus aerial image to the gate aperture of the projector head nearest the camera from the gate aperture of the projector head farthest away from the camera and in association with ray collecting means at the projector head nearest the camera to assure substantial uniform light distribution throughout the image field, while permitting the camera lens assembly to be $f$ stopped down without marginal vignetting of the picture area or frame field and thus allowing effective control of the exposure.

Another object of the present invention is to provide in such a plural-projector head optical printer a transfer lens means mounted for compound adjustment N–S and E–W as well as along the optical axis, and in association with suitable ray-collecting field lens means at the projector head located nearest the camera to permit efficient employment thereof in preparing with camera raw stock film composite images with proper registration of juxtaposed marginal portions of the composite image parts.

A further object of the invention is to provide in such an optical printer a transfer lens means located between the master projector head and the aerial image projector head and so associated with field lens means at the master projector head as to assure efficient employment of the printer in first photographing on raw stock in the camera background or scenic images on a fine-grain positive print in the master projector head with areas of foreground images to be superposed thereon being effectively protected from exposure by a matte in the aerial image projector head, the transfer lens means being suitably adjustable so as to permit preliminary alignment of the margins of an opaqued area or mask of a foreground image in the aerial image projector head and of a fine-grain positive print of the foreground image surrounded by an opaqued or masking field when located in the master projector head and in which the latter is to be translated later for exposure of the foreground image areas of the raw stock.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a diagrammatic view of an embodiment of the optical printer of the present invention, an alternate position of an important ray-collecting field lens means thereof being indicated in dotted lines;

FIG. 2 is a plan view to enlarged scale of a section of a strip of plural-frame, 35 mm. motion picture film in the form of a positive print showing one full frame thereof bearing an opaqued area of an exemplary superposable or foreground image surrounded by a transparent field, this strip having the purpose of serving as a matte (A) in practice of a printing procedure made possible by use of the optical printer diagrammatically illustrated in FIG. 1;

FIG. 3 is a plan view, similar to FIG. 2, of a like section of a strip of plural-frame, 35 mm. motion picture film in the form of a positive print showing one full frame thereof bearing a like superposable or foreground image in positive print or fine-grain form surrounded by an opaqued field, this strip serving as a matte (B) in the same printing procedure;

FIG. 4 is a plan view of a section of a strip of plural-frame, 35 mm. motion picture film in the form of a fine-grain or positive print (C) showing one full frame thereof bearing a positive background image upon which is to be superposed the positive foreground image of matte (B), as is suggested by dotted lines;

FIG. 5 is a diagrammatic perspective illustration of the first and perhaps the most important step in superposing a foreground image of matte (B), illustrated in FIG. 3, upon the background image of positive print (C), depicted in FIG. 4, this step being one of optical alignment or registration of the foreground image areas of mattes (A) and (B) respectively mounted in the aerial image and master projector heads;

FIG. 6 is a side elevational view of an image transfer lens assembly shown intervening the two projector heads diagrammatically illustrated in FIG. 1, a diagrammatic showing of this lens assembly appearing between the mattes (A) and (B) in FIG. 5;

FIG. 7 is an enlarged perspective view of the rectangular ray-collecting field lens associated with the transfer lens assembly which is interposed between the two projector heads in the FIG. 1 system, showing a mounting frame with parts broken away for fixedly supporting it on the master projector head;

FIG. 8 is a diagrammatic illustration similar to FIG. 5, illustrating the next step of the procedure of superposing a foreground image of matte (B) as an aerial image upon the background image of fine-grain print (C), this operation consisting of photographing on a strip of camera raw stock negative film (D) the background image with an unexposed area therein of the foreground image provided by an opaque aerial image of the foreground image;

FIG. 9 is a diagrammatic view similar to FIGS. 5 and 8 illustrating a succeeding step of the same procedure, depicting the photographing of the foreground image of matte (B) within the unexposed foreground image areas previously prepared within the photographed background image areas on the camera raw stock film (D) by the procedural step of FIG. 8;

FIG. 10 is a plan view, similar to FIG. 4, of a section of a strip of plural-frame, 35 mm. motion picture camera film (D) after it has been photographed by the procedural steps of FIGS. 8 and 9 and then developed, showing one full frame thereof bearing the composite image consisting of a negative of the foreground image of matte (B) superposed on a negative of the background image of fine-grain positive print (C);

FIG. 11 is a front elevational view, with parts broken away and in section, of structure suitable for mounting the transfer lens assembly between the pair of projector heads of the FIG. 1 optical printer system, illustrating means for attaining N-S, E-W and optical axis motion or adjustment of this lens assembly on the printer frame structure;

FIG. 12 is an end elevational view, with parts broken away and in section, of the structure shown in FIG. 11; and FIG. 13 is a ray diagram and diagrammatic showing of a portion of a modified form of the optical printer system of the present invention, illustrating use of a modified form of ray-collecting field lens located at a different position relative to the apertured gate of the master projector head, such as at the dotted position in FIG. 1.

Referring to the drawings, in which like numerals identify similar parts throughout, it will be seen that the optical printer of the present invention may be embodied in a system diagrammatically illustrated in FIG. 1. The optical printer will, in the usual manner, have a suitable frame structure upon which the various optical devices or elements are suitably supported, such frame structure not being shown in FIG. 1 as being unnecessary to an understanding of the invention by one skilled in the art. In the optical system of an embodiment of the present invention diagrammatically illustrated in FIG. 1 a suitable camera 20 is provided which may be of the known bi-pack type and having a head 21 including a gate 22 provided with a suitable aperture for exposure thereat of each frame of a strip 23 of plural-frame raw stock film, such as 35 mm. film, the gate aperture for this purpose having the dimensions of 0.980″ in width and 0.720″ in height. The film translating means of camera 20 may be in the form of a fixed pin registration film advancing means of known construction, diagrammatically illustrated at 24, which is associated with the gate 22, and a film driving sprocket 25 against opposite sides of which is lapped the film 23 on the advance side to be drawn off from a supply pack 26 and on the take-up side as it is led back to the take-up reel means 27. The camera 20 is suitably mounted upon the optical printer frame by means (not shown) for adjustment motion along the optical axis of its head, as is indicated by the double-ended arrow at 28. The camera head 21 includes conventional bellows-equipped light passage means 29 connecting it to a suitable camera lens assembly 30 and is equipped with a reflex field finder, the eye piece of which is illustrated at 31, so as to permit the operator to view the field of the camera lens assembly from therebehind. The camera lens assembly is likewise mounted for adjustment along the optical axis of the camera structure, as is indicated by the double-ended arrows 32, and for this purpose preferably is supported upon the camera structure by means (not shown) permitting such relative adjustment along the optical axis. The reflex field finder is of conventional construction and thus need not be illustrated, being of the type including an oblique mirror, diagrammatically illustrated at 33 in FIG. 5, suitably mounted for movement into a position of interception of the optical axis of the camera lens assembly 30 for viewing the field and then movable laterally from the path of the beam which is to be focused by the camera lens assembly upon the camera gate aperture. The camera lens assembly may be one of a variety of conventional constructions and, for illustrative purposes, may be symmetrical consisting of a pair of cemented meniscus doublets 34 and 134 arranged in the usual reverse order on opposite sides of an adjustable iris 35 constituting an adjustable stop with the opening therein adjustable in size by rotation of an iris or diaphragm ring 36. A 103 mm. lens unit having an iris opening of $f$ 2.8 capable of being stopped down to $f$ 22 is suitable.

The frame of the optical printer also supports a pair of projector head assemblies 37 and 38 with that at 37 including a head 39 constituting the master projector head and that at 38 including a head 139 constituting the aerial image projector head. The projector head assemblies 37 and 38 may be similar in construction, the master projector head 39 including an apertured gate 40 having a gate aperture 41 across which is to be translated frame-by-frame a strip 42 of plural-frame, 35 mm. motion picture film in the form of a fine-grain or positive print by any suitable means, such as a second fixed pin registration film advancing means, diagrammatically illustrated at 124, designed to translate the fine-grain upwardly step-by-step, one frame at a time, across the gate aperture with draw off from a lower supply reel 43 up to a top take-up reel 44. The master projector head assembly 37 is movably mounted upon the optical printer frame structure by means familiar to those skilled in the art (not shown) designed to permit N-S (upward and downward) adjustment motion, as is indicated by the double-headed arrow at 45, and E-W (lateral or transverse) adjustment motion, as is indicated by the double-headed oblique arrow 46, to permit proper initial alignment of the optical axes of the camera and this projector head, with gate aperture 41 of the latter located at the first or front principal focus of the camera lens assembly 30 and with the camera gate aperture 122 located at its second principal focus in conventional manner.

The aerial image projector head 139 includes an apertured gate 140 having a gate aperture 141 down past which a similar strip 142 of plural-frame, 35 mm. motion picture film in the form of a fine-grain positive print is to be translated by suitable means, such as another fixed pin registration film advancing means 224, from a top supply reel 143 down to a bottom take-up reel 144. There is associated with the aerial image projector head 139 a suitable condenser lens assembly 47 which may be an achromatic lens system including three elements in the form of a bi-convex rear lens glass 48 air spaced from a front cemented doublet 49 consisting of a plano-concave lens glass 50 and a bi-convex lens glass 51 together constituting an achromat. The condenser lens assembly 47 is associated with a suitable field lens 52 for the purpose of collecting the output light rays from the outer part of the projection beam and diverting them inwardly, to give a reasonably uniformly illuminated image in the gate aperture 141. With the lens glasses of the condenser lens assembly 47 being about 60 mm. (about 2.36") in diameter the field lens 52 may be rectangular about 51 mm. (about 2") wide and about 42.5 mm. (about 1.688") high having a focal length (F) of about ten and three quarters inches (10.75").

Behind the condenser lens assembly 47 is mounted a suitable light source 53, such as a 750 w. filament lamp, backed by a spherical concave mirror 54 which may be about three inches (3") in diameter having a radius of about three inches (3"). As is indicated by the bracket 55 in FIG. 1 the aerial image projector head assembly 38, the condenser lens assembly 47, the intervening field lens 52, the light source 53 and the mirror 54 are mounted together as a unitary structure to form a projector for handling 35 mm. film and this unit assembly is suitably mounted upon the printer frame structure for adjustment along the optical axis, as is indicated by the double-headed arrow 56. The lamp 53 and its spherical mirror 54 together constitute a common light source for both of the aerial image projector and master projector head assemblies 38 and 37.

In order that an aerial image of the image borne in each frame of the fine-grain positive print 142 translated across the aerial image gate aperture 141 be transferred in focus to the gate aperture 41 of the master projector head gate aperture 41, a transfer lens assembly 57 is inserted between the projector heads 39 and 139. By way of example, the transfer lens assembly 57 may be a 152 mm. (focal length F) lens assembly having a speed of f 2.7 with its intervening iris being capable of stopping down to f 22. Some details of this lens assembly are shown in FIGS. 1 and 6, and in the latter it is indicated that it includes a tubular barrel structure 58 carrying in the back end 59 thereof a lens doublet 60 consisting of a plano-concave lens glass 61 cemented to one face of a bi-convex lens glass 62, and with the forward end 63 of the barrel carrying another doublet 64 consisting of a bi-concave lens glass 65 cemented to a bi-convex lens glass 66. The barrel 58 has an externally-threaded mounting section 67 and a diaphragm adjusting rotary ring 68 for adjusting the iris opening. In a typical and practical embodiment of the system illustrated in FIG. 1 the iris stop opening of transfer lens assembly 57 is located about nine and three quarters inches (9.75") in front of the aerial image projector gate aperture 141, and behind the master projector gate aperture 41 at a distance of about ten inches (10"). The transfer lens assembly 57 is mounted for compound motion, in a manner more fully explained hereinafter, so as to be adjustable in the vertical directions N-S, as is indicated by the double-headed arrow at 69, and in the transverse E-W directions indicated by the oblique double-headed arrow 70, shown in FIG. 1. The transfer lens assembly 57 is also adjustable longitudinally along the printer optical axis, as is indicated by the double-headed arrow 71, also depicted in FIG. 1.

Immediately preceding or behind the master projector apertured gate 40 and as near thereto as is practically possible is mounted another ray-collecting field lens 152 which may be a substantial duplicate of the field lens 52, as is indicated in FIG. 7. Thus, as a practical matter, the field lens 152 is located about two inches (2") behind the master projector gate aperture 41 and has a focal length of about ten and three quarters inches (10.75"). The field lens 152 is to be fixedly mounted to the master projector head assembly 37 to be adjustably movable therewith, and for this purpose may be provided with a rectangular frame 72, a portion of which is shown in FIG. 7. Thus the master projector head assembly 37 and field lens 152 together constitute a unitary assembly, as is indicated by the bracket 73 in FIG. 1.

The first principal focus of the transfer lens assembly 57 is to be located at the film plane of the aerial image projector gate aperture 141 and, since it is necessary that images on film strip 142 translated through the aerial image projector head 139 be precisely or substantially in focus at the gate aperture 41 of the master projector head 39, the interpositioning of the field lens 152 does have a slight effect upon the location of the remote image plane beyond or ahead of the transfer lens assembly 57. In fact, when the field lens 152 is located between the transfer lens assembly 57 and the master projector gate aperture 41, these lenses together may be considered to constitute transfer lens means. It is important that a field lens, such as that proposed at 152 in FIG. 1, be employed in order that it provide a ray-collecting effect to permit the camera lens 30 to be f stopped down without vignetting the picture area or frame field. In the absence of such a ray-collecting field lens as that proposed at 152 the irises of the transfer lens assembly 57 and camera lens assembly 30 would have to be wide open or larger than the aperture size and one could not control the exposure therewith. Location of the field lens, such as that indicated at 152, is important since if it is located too near the transfer lens assembly 57 it will give an uneven field illumination or non-uniform distribution of light in the frame field and cause spherical aberration. The closer that field lens 152 is located to the film plane at master projector gate aperture 41 the better are the results which are obtained. The closer that the field lens 152 can be placed to this film plane the flatter is the in-focus curve of aberration. The same ray-collecting effect of a field lens, such as that provided at 152 in the FIG. 1 system, can be attained by locating such a field lens in front of rather than behind the film plane at the master projector gate aperture 41, such as is suggested in dotted lines at 74, and, as will be more fully explained hereinafter, it may be in such position a bi-convex field lens. The purpose of this ray-collecting field lens, whether located at 152 behind the master projector gate aperture 41 or at 74 in front of it, is the same. One may prefer the location at 74 in front of the master projector gate aperture 41 since it may there be located more closely to the gate aperture and as a practical matter may be placed only about three quarters of an inch (0.75") there in front, the closer spacing giving better results of less spherical aberration and more uniform distribution of light.

It is suggested in the diagrammatic showing of FIG. 1 that the optical elements of the optical printer of the present invention be arranged successively along an optical axis in substantial straight line arrangement relative to each other. However, those skilled in the art will readily understand that the employment of interposed reflectors will permit different relative arrangements with the attainment of the same optical axis alignment. For example, one may interpose a reflector between the aerial image projector head assembly 38 and the transfer lens assembly 57 so that the aerial image projector including its head 139, the condenser lens assembly 47, field lens 52 and light source 53, 54 may be arranged at right angles to the common in line optical axis of the remaining elements of the printer for conservation of space and perhaps to facilitate accessibility to separate controls.

The importance of a practical use to which the optical printer of the present invention may be put perhaps can better be understood by describing the use thereof in photographing on camera raw stock film composite images made up of separately photographed background images and foreground images. Let it be assumed that FIG. 3 represents a section (B) of a fine-grain positive print bearing in each frame 75 thereof a superposable or foreground image 76 surrounded by an opaque field 77. It is intended that the foreground image 76 be superposed upon a background image which had been photographed at a different location. By way of example, FIG. 4 illustrates a section (C) of a fine-grain positive print or film which had been prepared from a negative photographed at a different location, each frame 78 thereof bearing a pictorial scenic image 79 on which is to be superposed the foreground image 76 of the fine-grain positive print (B) of FIG. 3, as is suggested by the dotted lines 176 in FIG. 4. In order to accomplish this purpose, two mattes must be prepared, each of which will bear images representative of the foreground action. Such mattes (A) and (B) are illustrated in FIGS. 2 and 3 and may be prepared by photographing the lighted foreground action before a white background with the use of a beam splitting camera well-known to the art. As is well understood by those skilled in the art, such a beam splitting camera may include a prismatic beam splitter consisting of a pair of right angle prisms cemented together along their hypotenuse faces to form a cube with the oblique interface serving as a partial reflector directly through which the image may be photographed upon a film located therebehind and may simultaneously be photographed on another film located laterally thereof in a normal plane by rays reflected from the oblique reflective interface. With the use of suitable filters, negative prints for matte (A) of FIG. 2 and matte (B) of FIG. 3 may be prepared simultaneously. The matte (A) of FIG. 2 is also a fine-grain positive print prepared from one of the two negatives photographed by the beam splitting camera and bears in each frame 80 thereof an opaqued area 276 which is a duplicate of the area of the foreground image positive print 76 of matte (B) of FIG. 3. The foreground image opaqued area 276 of matte (A) is surrounded by a transparent field area 177 corresponding to the opaque field 77 of matte (B). The pair of positive print mattes (A) and (B) of FIGS. 2 and 3 and the fine-grain positive print (C) of FIG. 4 are then employed in the optical printer of the present invention, such as the embodiment diagrammatically illustrated in FIG. 1, in the following manner.

The first step in the procedure of preparing the composite image comprising foreground image 76 and background image 79 respectively of matte (B) and fine-grain positive print (C), illustrated in FIGS. 3 and 4, is graphically illustrated in the FIG. 5 diagrammatic showing. Matte (A) is placed in the aerial image projector head assembly 38 with a frame 80 thereof properly located at the aerial image gate aperture 141. Matte (B) is placed in the master projector head assembly 37 with a frame 75 thereof properly located adjacent the master projector gate aperture 41. The oblique mirror 33 of the reflex field finder is moved into position behind the camera lens assembly 30 so that when the operator looks into the reflex field finder eye piece 31 he can see whether the marginal edges of the opaqued foreground image area 276 on matte (A) are in exact alignment with the marginal edges of the fine-grain positive print of the foreground image 76 on matte (B) due to the provision at the image plane of the master projector gate aperture 41 of the latter and the projection thereto of an in-focus image of the opaqued area 276 of matte (A) through the transfer lens assembly 57 and field lens 152 by the beam from the common light source 53, 54 of the aerial image projector. If such alignment or exact registration of the fine-grain positive image 76 and the opaqued area 276 of mattes (B) and (A) does not exist, the operator carefully adjusts the position of the transfer lens assembly 57 in either N-S or E-W directions, or both, until such exact registration is attained. The optical printer is then in proper adjustment for the subsequent steps of the printing procedure.

Thereafter, matte (B) is removed from the master projector head assembly 37 and replaced by the fine-grain positive print (C), while matte (A) is retained in the aerial image projector head 38, as is illustrated in FIG. 8, with a frame 78 of the fine-grain (C) properly positioned adjacent the master projector head gate aperture 41. A strip 23 of unexposed plural-frame raw stock camera film (D) is then threaded into the camera 20 with a frame section 81 thereof properly located adjacent the camera gate aperture 122. The projector light 53 behind the aerial image projector head 139 is turned on to project an image of the opaqued foreground action area 276 from matte (A) to the image plane at the master projector gate aperture 41 and to project the areas of the fine-grain positive print of the background action 79 adjacent to or surrounding this foreground action area upon the raw stock frame section 81 in the area 179 adjacent to or surrounding an unexposed area of the foreground action image depicted in dotted lines at 376. Dotted lines are employed in the raw stock frame 81 of film strip (D) in FIG. 8 both to show the outline of the unexposed foreground action image and the details of the background image 79 being photographed thereabout since the film has not as yet been developed.

There following, matte (A) is removed from the aerial image projector head assembly 38 to leave its gate aperture 141 open and unobstructed and the fine-grain print (C) is replaced in the master projector head assembly 37 by matte (B), as is diagrammatically illustrated in FIG. 9. The raw stock in the camera 20 is rewound to the supply reel 26. It will be remembered that each frame 81 of the raw stock camera film (D) has a background area 179 exposed with an area therein corresponding to the foreground action image 376 unexposed. The projection light 53 behind the aerial image projector head 38 is then again turned on and the matte (B) is translated through the master projector head assembly 37 simultaneously with translation of the partially photographed camera raw stock (D) through the camera head 22 so as to photograph in each unexposed foreground action area 376 of the raw stock the details of the foreground action image 76 while the opaque field 77 of matte (B) protects the surrounding, previously exposed, background image area 179. The procedural step of FIG. 5 assures that there will be exact registration between the marginal outlines of the fine-grain positive print of foreground image 76 on matte (B) now being translated through master projector head 37 and the unexposed area 376 in each frame section 81 of the camera raw stock (D).

Following these two successive passes of the camera raw stock (D) through the camera to have all of the areas of each frame thereof photographed, the completely exposed camera film (D) is then developed to produce the negative 82 of FIG. 10, each frame 181 of which bears a negative 279 of the background image 79 surrounding a negative 576 of the foreground action image and without any intervening line of gap at any points which would produce in a positive print made therefrom a transparency causing halo effect when such positive print is projected.

In FIGS. 11 and 12 are illustrated suitable structure for mounting the transfer lens assembly 57 upon the frame structure of an embodiment of the optical printer of the present invention while providing for compound adjustment thereof in the N-S and E-W directions as well as along the printer optical axis. As will be seen from FIG. 11, bracket structure 83 may be provided for this purpose which may be mounted to the printer frame structure, a portion of which is indicated in section at 84, by suitable means, such as machine screws, a portion of one of which is shown at 85. Bracket structure 83 supports or fixedly carries a thrust bearing 86, and a pair of transversely-spaced guide strips or rails 87 and 187 extending along the horizontal bed of the printer frame structure, substantially parallel to the common printer optical axis. The guide strips 87 and 187 have their opposed sides provided with undercut, longitudinally-extending grooves 88, 88, in which ride complementally shaped edges 89, 89 of a slide plate 90. Slide plate 90 carries an index pin 91 and suitable machine screws 92 fixedly to mount thereon a cradle 93. Cradle 93 carries anchorage pins 94, 94 and bracket 83 carries a cooperative pair of anchorage pins 95, 95 with a pair of biasing tension springs 96, 96 connected therebetween to bias the slide 90 and the cradle or yoke 93 carried thereby in a direction toward the aerial image projector head assembly 38. As is indicated in FIG. 12, cradle or yoke 93 has bolted thereto an internally-threaded nut 97 into which is threadably engaged an externally-threaded screw or section 98 of a shaft 99 which is rotatably carried by thrust bearing 86. A hand wheel 100 is fixed to shaft 99 beyond the thrust bearing 86 and rotation thereof adjusts the position of the cradle or yoke 93 along the printer optical axis toward the camera 20 in opposition to the biasing of springs 96, 96. This structure permits adjustment of the transfer lens assembly 57 carried by the cradle or yoke 93 along the optical axis, such as in the direction of the double-headed arrow 71 of FIG. 1.

The cradle or yoke 93 illustrated in FIGS. 11 and 12 carries on opposite sides thereof upstanding projections or brackets 101 and 102 through which are journaled a transverse shaft 103 pinned to a base plate 104 by a drift pin 105. An end 106 of transverse shaft 103 extends beyond side bracket 102 of cradle 93, the projecting end carrying an externally-threaded sleeve 107 pinned thereto with this sleeve threadably engaged by internal threads 108 of a sleeve 109 in the form of a manual knob rotatably supported by a thrust bearing 110 against bracket 102. A helical compression spring 111 is arranged about transverse shaft 103 and has one end abutted against bracket 102 and the other end against an abutment face 112 of base plate 104. It will be seen from FIG. 12 that a second transverse shaft 113 is carried by cradle or yoke 93 and it is slidably received through a transverse bore in a portion of base plate 104 to cooperate with transverse shaft 106 slidably to support the base plate on the cradle or yoke. Rotation of the manual knob 109 causes the transverse shaft 106 to slide through the journals carried by brackets or projections 101 and 102 against the biasing of spring 111 for transverse E-W adjustment of the base plate 104.

Base plate 104 carries a pair of transversely-spaced, vertical posts 114 and 115 upon which is slidably supported a vertical, lens-mounting plate 116 having a horizontal hole therein about which is bolted a lens mounting ring or sleeve 117. Ring 117 has an internally-threaded section 118 into which is threadably engaged the externally-threaded section 67 of the transfer lens assembly 57. The vertical post 114 carries a clamp ring 119 between which and an abutment 212 is held a helical compression spring 211 arranged about this vertical post. An externally-threaded sleeve 207 is slidably arranged about the top end of post 114 and fixedly mounted to the vertical frame plate 116. An internally-threaded sleeve in the form of another manual knob 209 is threadably engaged with fixed sleeve 207 and a thrust bearing 210 is interposed between the outer transverse end wall 120 of manual knob sleeve 209 and the top end of post 114. Thus, when the manual knob 209 on the top end of the post 114 is rotated the lens-supporting vertical frame plate 116 is caused to move upwardly and downwardly in N-S directions.

Consequently, the lens mounting structure of FIGS. 11 and 12 will provide for the transfer lens assembly 57 compound motion in transverse directions of N-S and E-W while permitting adjustment of this lens assembly along the printer optical axis. This will permit the adjustment essential to the procedural step diagrammatically illustrated in FIG. 5 in attaining proper registry of the foreground action image areas of mattes (A) and (B) respectively located in the aerial image projector head 38 and the master projector head 37.

It was previously indicated that the ray-collecting field lens which is associated with the gate aperture 41 of the master projector head 37 may be positioned in front of the latter between the master projector head gate 40 and the camera lens assembly 30, such as in the dotted line position 74 of FIG. 1. FIG. 13 diagrammatically illustrates such positioning at 174. As is illustrated in FIG. 13, such field lens may be in the form of a bi-convex lens located as close to the master projector gate aperture 41 as it is physically possible to do so, such as at about three quarters of an inch (0.75") therefrom and, as in the case of the field lens 152, it will be supported by suitable frame structure fixedly carried by the master projector head assembly 37. In such a modified embodiment of the invention of FIG. 13, it will be understood that marginal rays of the beam emanating from the light source 53 and projected successively through the aerial image projector gate aperture 141 and transfer lens assembly 57 will tend to diverge beyond the edges of the master projector gate aperture 41. These marginal rays are collected or diverted inwardly by the field lens 174, so that the beam which is projected to the camera lens assembly 30 will be in the form of a tighter bundle of rays so as to assure uniform distribution of light in the frame field. It will be noted from FIG. 13 that the image plane at the second principal focus ($F_2$) of the transfer lens assembly 57 is located at the film plane of the apertured gate 40 so that an aerial image projected from the aerial image projector head 139 through the transfer lens assembly 57 will be superposed in focus upon the image in a frame of the film in the master projector head at gate aperture 41. This permits the camera lens assembly 30 to be $f$ stopped down without undue vignetting of the picture area or frame field, just as in the case of the use of the field lens at 152 ahead of the master projector gate aperture 41 of the FIG. 1 system, while having the advantage of being locatable closer to this gate aperture so as to reduce spherical aberration and attain a more uniform light distribution in the frame field.

As an aid to practice of the invention in various structural embodiments, it may be advantageously remembered that the distance from the optical center of the transfer lens assembly 57 to the aerial image projector gate aperture 141 can be no greater than four times the focal length (F) of the transfer lens assembly. This limits the maximum distance of location of the transfer lens assembly 57 ahead of the aerial image projector gate aperture 141 and adjustment of these units relative to each other is permitted by the provision of the mounts thereof with means to permit adjustment along the printer optical axis, such as is indicated by the double-headed arrows 71 and 56. The remote image plane at the second principal focus of either the transfer lens assembly 57 alone in the FIG. 13 embodiment or together with the field lens 152 in the FIG. 1 embodiment must be located at the film plane adjacent the gate aperture 41 of the master projector head 37 in order to attain a sharp in-focus aerial image at the latter projected from the aerial image projector head 139. Thus, the master projector head 39 is the relatively fixed unit which determines the locations of the aerial image projector head assembly 38, the transfer lens assembly 57, and the camera 20 and its lens assembly 30 along the printer optical axis.

The embodiments of the optical printer illustrated and described herein by way of example are designed for one to one (1:1) printing work in which the magnification factor is unity but there is provision for adjustment to permit sizing. The provision of the field lens either at 152 in FIG. 1 or at 174 in FIG. 13 permits the camera 20 with its apertured gate 22 to be moved to various positions along the printer optical axis for enlargement or reduction of image sizes without producing unevenness in light distribution in the frame field. Control of exposure is permitted and this is compensated for by the iris or adjustable diaphragm stop of the camera lens assembly 30. The film plane at the master projector gate aperture 41 can never be closer to the raw stock plane at the camera gate aperture 122 than four times the focal length of the camera lens assembly 30 in the FIG. 1 system, or that of the optical combination of this camera lens assembly and the field lens 174 when the latter is located in front of the master projector gate aperture 41 as is proposed in the FIG. 13 embodiment. When the field lens is located behind the master projector gate aperture 41, such as in the position 152 of the FIG. 1 system, such compensation for exposure by adjustment of the $f$ stop of the camera lens assembly iris 35 may also be obtained. When enlargement of the image as it is photographed upon the raw stock is required, the camera 20 is moved back to move its gate aperture 122 forward from the master projector gate aperture 41 in the direction of the right hand end of the double-headed arrow 28 of FIG. 1 and its camera lens assembly 30 is moved forward relative to the camera toward this master projector gate aperture back in the direction of the left hand end of the double-headed arrow 32 of FIG. 1 to nearer approach of the master projector gate aperture 41. In reducing image size, the camera lens assembly 30 will be moved back in the direction of the right hand end of the double-headed arrow 32 of FIG. 1.

A further advantage in employing embodiments of the optical printer of the present invention over prior practices where mattes are translated through gates in contact with either fine-grain or raw stock by bi-pack operations is the elimination of "ride" which is frequently experienced in such prior conventional operations, in which precise registration is not attained due to jiggling of one film relative to the other slightly in the translations thereof. Since mattes (A) and (B), FIGS. 2 and 3, are difficult to prepare with beam splitter cameras with the outlines of the foreground action areas in exact proper alignment to provide a precise registration in subsequent printing operations, the optical printer of the present invention provides for ready correction adjustment by compound motion of the transfer lens assembly 57 in the test procedural step of FIG. 5. Printing procedures which are easily and effectively practiced in operation of embodiments of the optical printer of the present invention can conserve much time necessary to bi-pack operations in which the superposing of a title upon an image projected from a master projector head to raw stock in the camera requires translating the title film through the camera gate with the raw stock or master projector gate with the fine-grain positive print. Also, such procedure of operation of the present printer permits ready printing of unique effects, such as the superposing of a title in which there may be zoom in or zoom out effects in one or more portions thereof, the title film being translated through the aerial projector head and the fine-grain image film translated through the master projector head simultaneously to superpose the images thereof upon the raw stock in the camera. It it be desired to make the foreground action images on one of the mattes (A) and (B) slightly smaller than on the other and with slightly fuzzy effect by a slightly out of focus condition so as to give a vignetting effect to soften the sharp black outline between the image portions being superposed in the composite image, this can readily be attained by performing the printing in the optical printer of the present invention. Also, printing procedure with use of the optical printer of the present invention permits in a ready manner fine adjustment to compensate for a shrunk matte, which is readily guided by observation in the reflex finder of the camera in the procedural step of FIG. 5. Many other effects with color photography, tilting, inserting foreign titles, with single pass, etc., are possible with use of the present system, and employment therein of the aerial image projector head is ideally suited for about 90% of the work that would normally be done in the bi-pack equipment of a camera practicing conventional contact translation of matte films with fine-grains or camera raw stock through the same gates. Loading is easy and much faster and synchronization is simple while visual composing and sizing are simplified, in addition to the elimination of the chance of scratching fine-grains or raw stock with mattes. Since the light which passes through the film in the aerial image projector head is also used as the light source for filling up the entire aperture of the master projector head, there is a small percentage of printing operations normally carried out by bi-pack contact printing operations which cannot be to advantage performed by operating the optical printer of the present invention, such as employing the auxiliary projector head for push-offs or reducing size more than that which permits completely filling the aperture with printing light, and the employment of a fine-grain or traveling matte as an aerial image may not provide the quality required in certain printing which can be attained by bi-pack contact printing, but only a small percentage of traveling matte requirements cannot be performed by the optical printer of the present invention to the full satisfaction of all demands. The advantages of the optical printer of the present invention over bi-pack contact printing procedures are so great and so completely satisfactory in most of the operations that it is used to complete satisfaction in producing a large percentage of the special effects printing. Where bi-pack contact printing does give better results for certain isolated operations to more complete satisfaction of the demands of an operator these conventional contact printing procedures can be performed by units of the optical printer of the present invention when the camera and master projector head are provided with suitable bi-pack equipment.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an optical printer the combination with a strip film camera having a camera lens assembly, a field finder, an apertured gate and a raw stock strip film advancing means associated with said apertured gate, and a pair of first and second strip film projector heads each having a fine-grain strip film apertured gate and a strip film advancing means associated with said projector gate with the gate apertures of both projector heads being substantially optically aligned successively along a printer optical axis including the optical axis of the camera lens assembly, the first projector head being located farthest from the camera and having projector light beam means common to both said projector heads optically aligned with the printer optical axis and being in the form of a condenser lens assembly and a light source back of the latter all together constituting an aerial image projector with said condenser lens assembly and light source also constituting the projection light beam means of said second projector head located optically between said first projector head and said camera; of supporting frame means; means mounting said second projector head on said frame means at a fixed point along the optical axis with said second projector head and said projection beam means together constituting the master projector; a field lens having a ray collecting effect mounted on said frame means closely adjacent to and optically aligned with the gate aperture of said second projector head and in fixed relation to the latter; means movably mounting said first projector head and said common projector light beam means together as a unit on said frame means for adjustment of this unit along the printer optical axis; an image transfer lens means interposed between said aerial image projector and master projector heads with its optical axis substantially aligned with the printer optical axis, said image transfer lens means having its first principal focus located at the gate aperture of said aerial image projector and its remote image plane at its second principal focus located at the gate aperture of said master projector head for superposing upon a fine-grain strip film image at the latter an aerial image of the image carried by fine-grain strip film translated through the aerial image projector head at its gate aperture; and means independently supporting and movably mounting said transfer lens assembly on said frame means for compound adjustment movement up and down and laterally back and forth all normal to the printer optical axis, and additionally forward and backward along the printer optical axis.

2. The optical printer as defined in claim 1 characterized by said field lens being mounted immediately ahead of the gate aperture of said master projector head between the latter and said image transfer lens means.

3. The optical printer as defined in claim 1 characterized by said field lens being mounted immediately beyond the gate aperture of said master projector head between the latter and said camera lens assembly.

4. An optical printer comprising, in combination; a fixed frame structure; a strip film camera having an apertured gate, a raw stock strip film advancing means to translate a strip of raw stock plural-frame film through the gate across the aperture thereof, a camera lens assembly in front of said gate, a field finder to view the field back through the camera lens, means movably mounting said camera lens assembly to the remaining camera structure for adjustment of said lens assembly along its optical axis toward and away from said gate, and means movably mounting said camera on said frame structure for adjustment thereof along the optical axis of its lens; a master strip film projector head mounted on said frame structure in front of said camera lens assembly and having an apertured gate, a strip film advancing means to translate a strip of fine-grain plural-frame film through the projector gate across the aperture thereof, a ray collecting field lens fixedly mounted on said projector head immediately beyond and closely adjacent to said gate with the latter intervening said camera lens assembly and said field lens and with said camera lens, gate aperture and field lens being optically aligned successively along a printer optical axis, and means movably supporting said master projector head and said field lens fixedly carried thereon upon said frame structure at a fixed point along the printer optical axis in front of said camera lens assembly for compound lateral movement adjustment up and down and laterally back and forth all normal to the printer optical axis; an aerial image strip film projector head located ahead of said master projector head in appreciably spaced relation to the latter and having an apertured gate with its aperture in substantial optical alignment with the gate aperture of said master projector head along the printer optical axis, said aerial image projector head also having a strip film advancing means to translate a strip of fine-grain plural-frame film through its gate across the aperture thereof, a condenser lens assembly fixedly mounted to said aerial image projector head, a common projecting light source fixedly mounted to this projector head ahead of said condenser lens assembly with the latter and said light source optically aligned with the optical axis of the gate aperture of this projector head, and means movably supporting said light source, condenser lens assembly and aerial image projector head together on said frame structure for adjustment thereof along the printer optical axis; an image transfer lens assembly interposed between said aerial projector head and said field lens carried by said master projector head with its optical axis substantially aligned with the printer optical axis, said image transfer lens assembly having its first principal focus located at the gate aperture of said aerial image projector head and its remote image plane at its second principal focus located beyond said field lens at the gate aperture of said master projector head for superposing upon a fine-grain strip film image at the latter an aerial image of the image carried by fine-grain strip film translated across the aerial image projector head gate aperture; and means independently supporting and movably mounting said transfer lens assembly on said frame structure for compound adjustment movement up and down and laterally back and forth all normal to the printer optical axis, and additionally forward and backward along the printer optical axis.

References Cited in the file of this patent
UNITED STATES PATENTS

| | | |
|---|---|---|
| 1,361,012 | Capstaff | Dec. 7, 1920 |
| 2,174,931 | Terry et al. | Oct. 3, 1939 |
| 2,488,177 | Dufour | Nov. 15, 1949 |
| 2,622,475 | Tondreau | Dec. 23, 1952 |

UNITED STATES PATENT OFFICE
CERTIFICATE OF CORRECTION

Patent No. 3,040,619                        June 26, 1962

John W. Oxberry

It is hereby certified that error appears in the above numbered patent requiring correction and that the said Letters Patent should read as corrected below.

Column 12, line 48, strike out "pair of".

Signed and sealed this 30th day of October 1962.

(SEAL)
Attest:

ERNEST W. SWIDER                        DAVID L. LADD
Attesting Officer                          Commissioner of Patents